United States Patent
Shi et al.

(10) Patent No.: US 11,468,364 B2
(45) Date of Patent: Oct. 11, 2022

(54) DETERMINING IMPACT OF FEATURES ON INDIVIDUAL PREDICTION OF MACHINE LEARNING BASED MODELS

(71) Applicant: Humana Inc., Louisville, KY (US)

(72) Inventors: Molu Shi, Prospect, KY (US); Gilbert S. Haugh, Louisville, KY (US); Harpreet Singh, Louisville, KY (US)

(73) Assignee: Humana Inc., Louisville, KY (US)

( * ) Notice: Subject to any disclaimer, the term of this patent is extended or adjusted under 35 U.S.C. 154(b) by 608 days.

(21) Appl. No.: 16/565,388

(22) Filed: Sep. 9, 2019

(65) Prior Publication Data

US 2021/0073672 A1 Mar. 11, 2021

(51) Int. Cl.
*G06N 20/00* (2019.01)
*G06F 17/15* (2006.01)
*G06F 17/16* (2006.01)

(52) U.S. Cl.
CPC ............ *G06N 20/00* (2019.01); *G06F 17/15* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 2019/0108470 A1* | 4/2019 | Jain | G06Q 10/063118 |
| 2022/0150004 A1* | 5/2022 | Deixler | H04W 72/0453 |

OTHER PUBLICATIONS

Alvarez-Melis, D. et al., "On the Robustness of Interpretability Methods," arXiv: 1806.08049, Jun. 21, 2018, pp. 66-71.
Apley, D.W., "Visualizing the Effects of Predictor Variables in Black Box Supervised Learning Models," arXiv: 1612.08468, Dec. 27, 2016, pp. 1-36.
Bastani, O. et al., "Interpreting Blackbox Models via Model Extraction," arXiv: 1705.08504, May 23, 2017, pp. 1-20.
Fisher, A. et al., "Model Class Reliance: Variable Importance Measures for any Machine Learning Model Class, from the "Rashomon" Perspective," arXiv: 1801.01489, Jan. 4, 2018, pp. 1-49.
Fong, R. C. et al., "Interpretable Explanations of Black Boxes by Meaningful Perturbation," arXiv:1704.03296, Apr. 11, 2017, pp. 1-9.
Friedman, J. H. et al., "Predictive Learning Via Rule Ensembles," The Annals of Applied Statistics, vol. 2, No. 3, Sep. 2008, pp. 916-954.
Goldstein, A. et al., "Peeking Inside the Black Box: Visualizing Statistical Learning with Plots of Individual Conditional Expectation," arXiv:1309.6392, Mar. 20, 2014, pp. 1-22.

(Continued)

*Primary Examiner* — Craig C Dorais
(74) *Attorney, Agent, or Firm* — Fenwick & West LLP

(57) ABSTRACT

A system trains a machine learning based model to predict the likelihood of an outcome for an entity, for example, a user. The system determines, for a particular prediction for a user, feature impact scores that indicate how each feature of the user impacted the prediction for that user. The feature impact scores are ranked to determine top driver features for the user that had the highest impact on the prediction. The system generates a human understandable description for the top driver features. The system provides the generated description for the top driver features for display, for example, via a user interface.

20 Claims, 8 Drawing Sheets

(56) References Cited

OTHER PUBLICATIONS

Guidotti, R. et al., "A Survey of Methods for Explaining Black Box Models," ACM Computing Surveys, vol. 51, No. 5, Article 93, Aug. 2018, pp. 1-42.
Ithapu, V. K. et al., "Decoding the Deep: Exploring class hierarchies of deep representations using multiresolution matrix factorization," CVPR Workshop on Explainable Computer Vision and Job Candidate Screening Competition, vol. 2, Jul. 2017, pp. 45-54.
Lakkaraju, H. et al., "Interpretable & Explorable Approximations of Black Box Models," arXiv:1707.01154, Jul. 4, 2017, pp. 1-5.
Lundberg, S. M. et al., "An unexpected unity among methods for interpreting model predictions," arXiv:1611.07478, Dec. 8, 2016, pp. 1-6.
Molnar, C. "Interpretable machine learning. A Guide for Making Black Box Models Explainable", 2019, pp. 1-314, <URL: https://christophm.github.io/interpretable-ml-book/>.
Ribeiro, M.T. et al., "Why Should I Trust You?: Explaining the Predictions of Any Classifier," Proceedings of the 22nd ACM SIGKDD International Conference on Knowledge Discovery and Data Mining, Aug. 2016, pp. 1135-1144.

\* cited by examiner

DETERMINING IMPACT OF FEATURES ON INDIVIDUAL PREDICTION OF MACHINE LEARNING BASED MODELS

BACKGROUND

The disclosure relates to machine learning based models in general and more specifically to determining impact of features processed by a machine learning based model on the output result predicted by the model.

Machine learning based models are increasingly being used for applications, for example, for predicting likelihoodTM of certain user actions, for image analysis, for predicting behavior of processes or systems, for predicting failure of instruments, and so on. Examples of machine learning based models include linear regression, logistic regression, support vector machines, multi-perceptron neural networks, deep learning models, random forest, gradient-boosted trees, and so on. A machine learning based model is typically treated as a black box that provides answers based on some inputs. For example, a system may provide sensor data associated with an instrument as input to neural network to predict failure of the instrument. However, the system is unable to determine which features were the likely cause of the instrument failure. The ability to determine the impact of various features on the output of a machine learning based model provides better understanding of the behavior of entities being modeled and allows appropriate actions to be taken, for example, by a system administrator. Conventional techniques are either unable to determine feature impact for machine learning models used in practical applications, for example, neural network based models, or are either computationally slow and highly inefficient or suffer from severe limitations.

SUMMARY

A system determines impact of features processed by a machine learning based model on results predicted by the model. The system determines a model sensitivity by changing value of a specific feature in a feature vector of a user to a feature value based on other users. The system ranks the features based on aggregated model sensitivity to identify the top driver features that are most likely to affect the output of the model for that particular user.

The machine learning based model receives as input a plurality of features and predicts an output score. The system identifies a user associated with a feature vector comprising values of the plurality of features.

The system performs the following processing for each feature. The system determines a set of feature values of the feature based on other users used for training the machine learning based model. For each feature value selected from the set of feature values, the system determines a feature impact component value as follows. The system obtains a first output score value by providing the feature vector as input to the machine learning based model. The system determines a modified feature vector by replacing the value of feature in the feature vector with the selected feature value. The system provides the modified feature vector as input to the machine learning based model to obtain a second output score value. The system determines a feature impact component value based on a difference of the second output score value and the first output score value.

The system determines a feature impact score for the feature as an aggregate of the feature impact component values for the feature. The system selects top driver features based on the feature impact scores of the features. The system generates description of each of the top driver features and sends the generated description for display.

In an embodiment, the set of feature values comprises features values of users used for training the machine learning based model. The corresponding feature impact score for the feature is determined as an average of the feature impact component values for the feature over the plurality of users.

In an embodiment, the set of feature values comprises features values corresponding to each of a plurality of bins, each bin representing one or more feature values for the feature. In this embodiment, the feature impact score for the feature is determined as a weighted aggregate of the feature impact component values for the feature. The weight for each bin is determined based on a number of users having feature values of that bin.

In an embodiment, the information describing the top driver features comprises a name of the feature and a description of a bin corresponding to the feature value.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments of the invention provide features describing an entity as input to a machine learning model to predict a score value. Examples of entities include users, computing systems, sensors, instruments, and so on. The system ranks the features of the entity in an order of their impact on the score value predicted for that particular entity. Accordingly, features that had a higher impact in generation of the score value for that particular entity are ranked higher than features that had small impact in generation of the score value. The features with highest impact in determining the score value for that particular entity are referred to as the top driver features. The system generates human understandable description of the top driver features for display.

Overall System Environment

Figure 1:
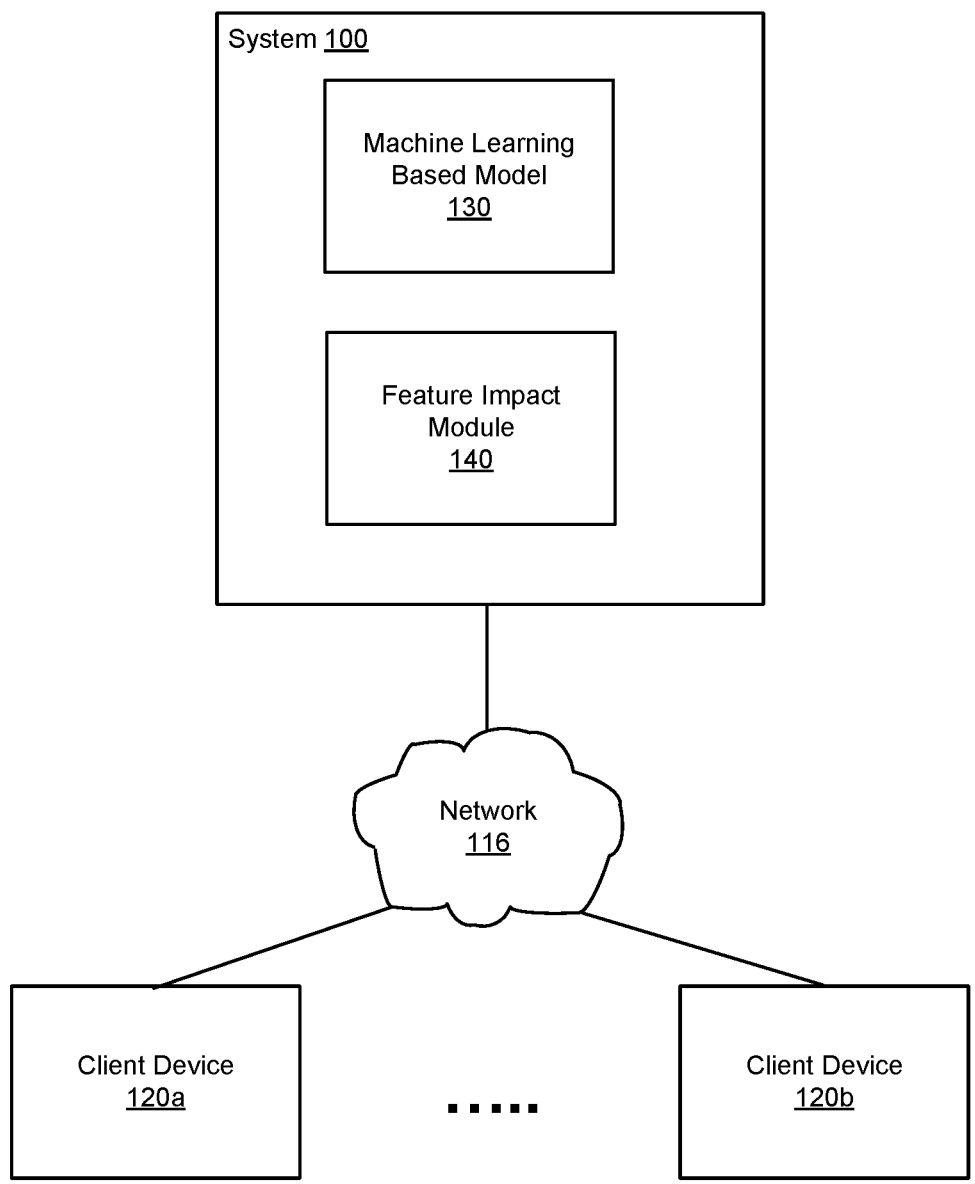
FIG. 1 shows the overall system environment of a system configured to use and analyze machine learning based models, according to an embodiment.

FIG. 1 shows the overall system environment of a system configured to use and analyze machine learning based models, according to an embodiment. The overall system environment 110 includes a system 100, a network 116, and one or more client devices 120. In other embodiments, more or less systems/components than those indicated in FIG. 1 may be used. A user may interact with the system 100 via the client device 120 through the network 116. Furthermore, there may be more or less instances of each system shown in FIG. 1, such as the client device 120.

The system 100 includes a machine learning based model 130 and a driver impact module 140. The machine learning based model 130 receives a set of features as input to predict certain score. The features may describe certain entity, for example, a user, an instrument, an online system, and so on. The score may predict a behavior of the entity, for example, the entity may represent a user and the score may represent a likelihood of the user performing an action; the entity may represent an instrument and the score may represent a likelihood of failure of the instrument; the entity may represent an online system and the score may represent the likelihood of the online system performing below a threshold, and so on.

The driver impact module 140 determines the top driver features that impacted the score value for a particular entity. For example, the machine learning based model may receive one hundred features as input, $x_1, x_2, x_3, x_4, \ldots x_{100}$. The machine learning based model may generate a score $S_1$ for entity $E_1$ and score $S_2$ for entity $E_2$. For an entity $E_1$, the driver impact module 140 may identify features $x_4, x_7,$ and $x_6$ as the top driver features that caused the model to generate the score value $S_1$ and for entity $E_2$, the driver impact module 140 may identify features $x_{12}, x_{17},$ and $x_3$ as the top driver features that caused the model to generate the score value $S_2$.

The client device 120 used by a user for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 120 can be any device having computer functionality, such as a personal digital assistant (PDA), mobile telephone, smartphone, wearable device, etc.

The interactions between the client devices 120 and the system 100 are typically performed via network 116, for example, via the Internet. The network enables communications between the client device 120 and the online system 100. In one embodiment, the network 116 uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 116 can also include links to other networks such as the Internet.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

System Architecture

Figure 2:
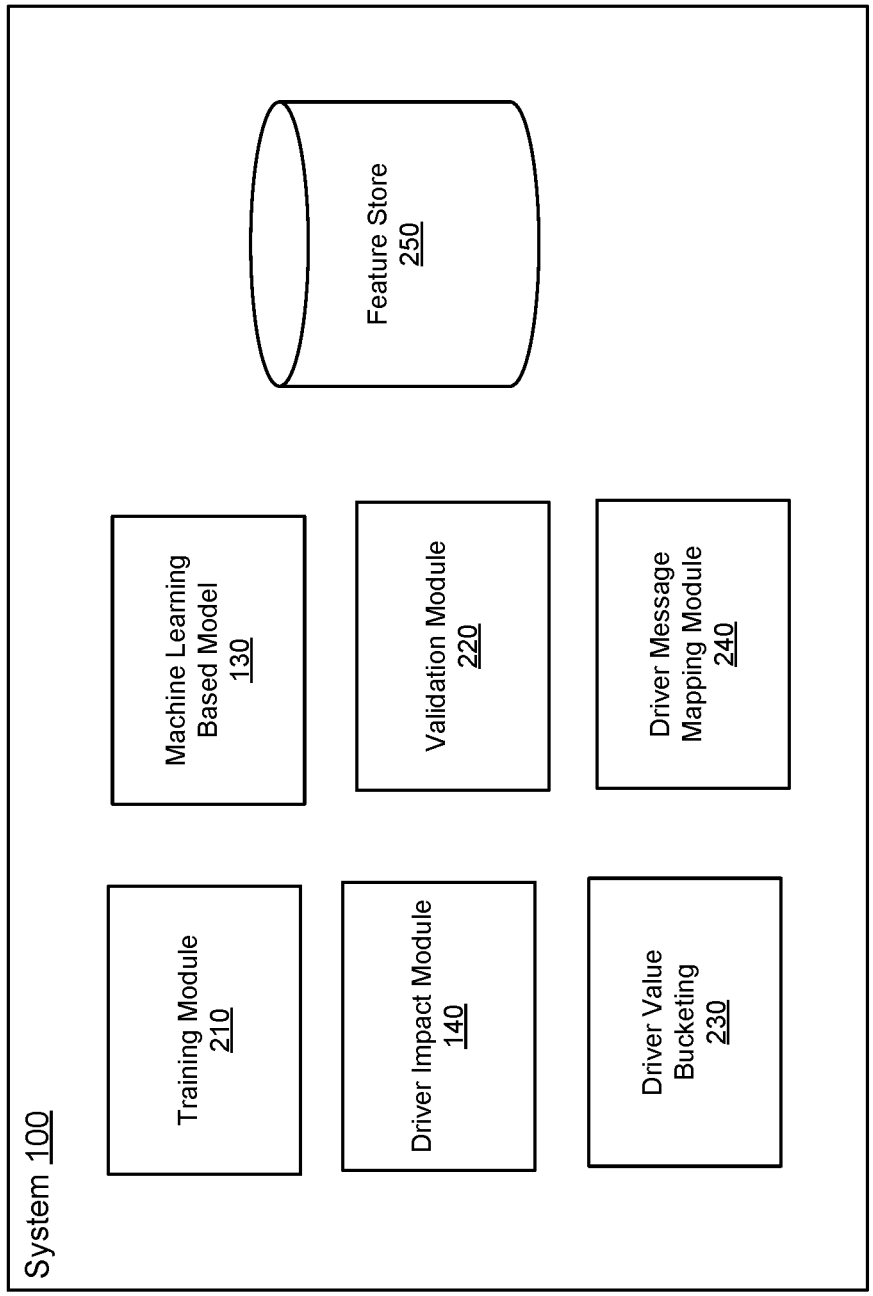
FIG. 2 shows the system architecture of the system configured to use and analyze machine learning based models, according to an embodiment.

FIG. 2 shows the system architecture of the system configured to use and analyze machine learning based models, according to an embodiment. The system 100 comprises a training module 210, a machine learning based model 130, a driver impact module 140, a validation module 220, a driver value bucketing module 230, a driver message mapping module 240, and a feature store 250. Other embodiments may include other modules. Actions indicated as being performed by a particular module may be performed by other modules than those indicated herein.

The training module 210 uses a training data set to train the machine learning based model 130. Different machine-learning based models 130, such as linear support vector machine (linear SVM), boosting for other algorithms (e.g., AdaBoost), neural networks, logistic regression, naive Bayes, memory-based learning, random forests, bagged trees, decision trees, boosted trees, or boosted stumps-may be used in different embodiments. In some embodiments, the training module 210 iteratively re-trains the machine-learning based model 140 until the occurrence of a stopping condition, such as the accuracy measurement indication that the model is sufficiently accurate, or a number of training rounds having taken place The feature store 200 stores features for entities being processed by the machine learning based model 140, for example, users. Each user may be associated with a plurality of features, for example, a few hundred features. In an embodiment, the feature store 200 is a database that stores relations between users and features. Examples of features stored in the feature store 200 depend on the type of entity and the type of model. For example, for a user, the feature store 200 may store features describing the user's height, age, fair color, race, ethnicity, marital status, and so on.

The driver value bucketing module 230 assigns normalized scales to features. For example, the driver value bucketing module 230 may divide a feature value into various ranges and assign a descriptive text string to each range. In an embodiment, the driver value bucketing module 230 stores a feature bucket mapping table that maps ranges of feature values to textual description of the feature values, for example, range of feature values "x>=80" may be mapped to "large values", range of feature values "x<40" may be mapped to "small values", and range of feature values "x>=40 and x<80" may be mapped to "medium values." The driver value bucketing module 230 provides these descriptions to the driver message mapping module 240.

The driver message mapping module 240 generates human readable messages for presenting to users. The driver message mapping module 240 assigns descriptive names to features and also descriptive names to ranges of values of the features to generate a readable text string describing a feature value. The driver message mapping module 240 provides the human readable description for top driver features to users for display via a user interface or as messages.

The validation module 220 evaluates performance of the driver impact determination process. The validation module 220 generates a correlation score based on a ground truth value of the features and aggregate values of feature impact scores generated by the driver impact module 140. The validation module 220 may be used to validate the performance of any driver impact determination process. Accordingly, performances of different driver impact processes can be evaluated against each other.

Overall Process

Figure 3:
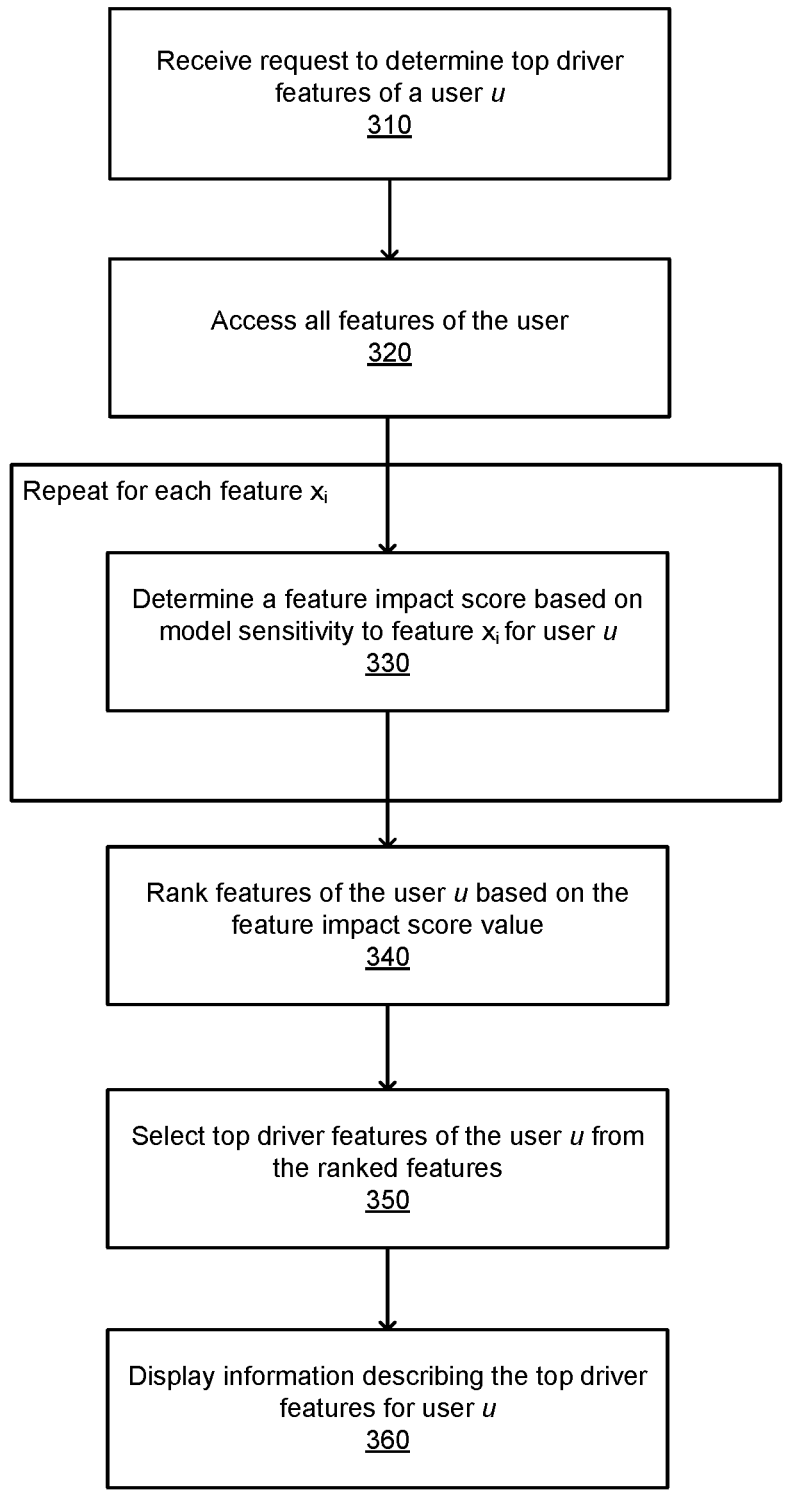
FIG. 3 shows a flowchart illustrating the overall process for determining top driver features for a user, according to an embodiment.

FIG. 3 shows a flowchart illustrating the overall process for determining top driver features for a user, according to an embodiment. The steps described herein may be performed by modules other than those described herein. Furthermore, the steps may be performed in an order different from that shown herein, for example, certain steps may be performed in parallel. Although the following process is described for a machine learning based model 130 that predicts a score for a user u, the techniques described can be applied for any machine learning based model that predicts any value for any entity.

The system 100 receives 310 a request to determine top driver features for the user u. The request may be received from an application running on a client device 120. Alternatively, the system 100 may determine top driver features for one or more users in an offline manner, for example, as a batch process.

The driver impact module 140 accesses features of the user u from the feature store 250. The features may be represented as $x_1, x_2, x_3, \ldots x_m$. For each feature $x_i$, the driver impact module 140, determines a feature impact score based on model sensitivity of feature $x_i$ for user u.

The driver impact module 140 may determine model sensitivity as follows. Assume that the machine learning based model 130 is represented as $f(x_1, x_2, x_3, \ldots X_m)$. The driver impact module 140 determines the feature impact score $Y(x_i^{(u)})$ for feature $x_i$ as the expectation value of model sensitivity to feature xi as shown in equation (1).

$$Y(x_i^{(u)}) = E(f(x_i, x_2, x_3, \ldots, x_i, \ldots, x_m) - f(x_1, x_2, x_3, \ldots, x_i^{(u)}, \ldots x_m)|x_i) \quad (1)$$

In equation (1), E represents the expectation value determined over a sample distribution of feature $x_i$, on the population using which the machine learning based model 130 was trained. In equation (1), $x_i^{(u)}$ represents the original value of $x_i$ for user u. The determination of the feature impact score is described in further detail in FIG. 4.

The driver impact module 140 ranks features of the user u based on the feature impact score values. The driver impact module 140 selects the top driver features of the user from the ranked features. The driver impact module 140 may store the top driver features or send them for display, for example, via a client device 120. In an embodiment, the top driver features are displayed along with information describing the features as determined by the driver message mapping module 240.

Figure 4:
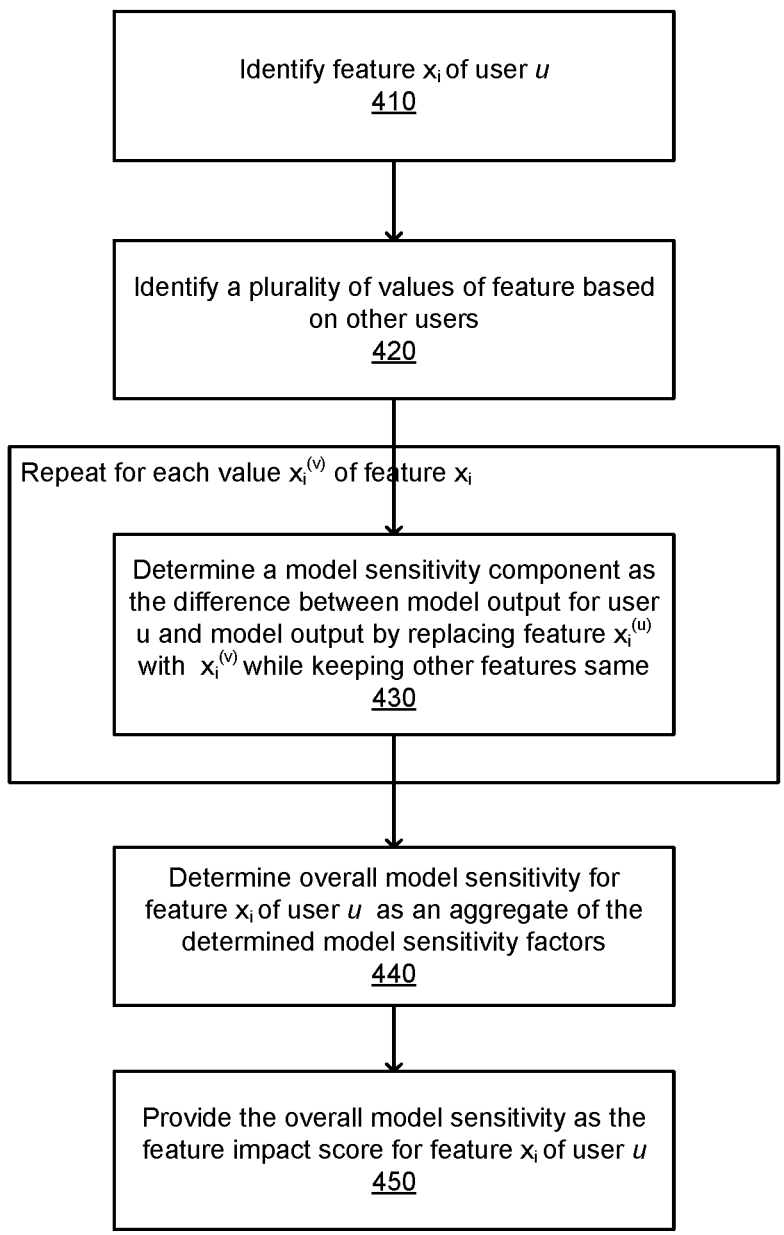
FIG. 4 shows a flowchart illustrating the process for determining feature impact score for a feature, according to an embodiment.

FIG. 4 shows a flowchart illustrating the process for determining feature impact score for a feature, according to an embodiment. The steps described herein may be performed by modules other than those described herein. Furthermore, the steps may be performed in an order different from that shown herein, for example, certain steps may be performed in parallel.

The driver impact module 140 identifies 410 a feature $x_i$, for which the feature impact score needs to be determined. The driver impact module 140 identifies a plurality of values of feature $x_i$ based on other users that were used for training the machine learning based model 130. The driver impact module 140 repeats the following step 430 for each of the plurality of values of feature $x_i$ based on other users. The driver impact module 140 determines 430 a feature impact component as the difference between model output for user u (i.e., $S_u = f(x_1, x_2, \ldots, x_i^{(u)}, \ldots x_m)$) and model output by replacing feature $x_i^{(u)}$ with $x_i^{(v)}$ while keeping other features same (i.e., $S_v = f(x_1, x_2, \ldots, x_i^{(v)}, \ldots, x_m)$). The driver impact module 140 determines 440 an overall model sensitivity of feature $x_i$ for user u as an aggregate of all the model sensitivity component values as shown in equation (2) below.

$$Y(x_i^{(u)}) = \frac{1}{N}\sum_{v=1}^{N} f(x_1, x_2, \ldots, x_i^{(v)}, \ldots, x_m) - f(x_1, x_2, \ldots, x_i^{(u)}, \ldots x_m) \quad (2)$$

In equation (2), N represents the total population size. The driver impact module 140 returns the value of the overall model sensitivity of feature $x_i$ for user u as the feature impact score for feature $x_i$ for user u.

In an embodiment, the various values $x_i^{(v)}$ of feature $x_i$ based on other users used for training the machine learning based model 130 may be selected from a sampled subset of users used for training the machine learning based model 130. For large sample size, the computation of the feature impact score may be computationally expensive if every user used for training of the machine learning based model 130 is used for determination of feature impact score for every feature.

In some embodiments, the driver impact module 140 divides the different values of feature $x_i$ for different users into bins. Each bin may represent a range of values for the feature $x_i$. The driver impact module 140 generates a histogram representing a frequency of occurrence of each bin. The driver impact module 140 determines the value of the model sensitivity $Y(x_i^{(u)})$ as the following equation (3) that determines a weighted aggregate value of the difference of the model output $f(x_1, x_2, \ldots, \bar{x}_i^{(j)}, \ldots, x_m)$ and the model output $f(x_1, x_2, \ldots, x_i^{(u)}, \ldots x_m)$.

$$Y(x_i^{(u)}) = \Sigma_j{}^{Li} w_j [f(x_1, x_2, \ldots, \bar{x}_i^{(j)}, \ldots, x_m) - f(x_1, x_2, \ldots, x_i^{(u)}, \ldots x_m)] \quad (3)$$

Accordingly, for each feature value selected from the set of feature values, the driver impact module 140 provides the feature vector as input to the machine learning based model to obtain a first output score value $f(x_i, x_2, \ldots, x_i^{(u)}, \ldots x_m)$. The driver impact module 140 determines a modified feature vector by replacing the value of feature in the feature vector with the selected feature value and provides the modified feature vector as input to the machine learning based model to obtain a second output score value $f(x_1,$ $x_2, \ldots, \bar{x}_i^{(j)}, \ldots, x_m$). The driver impact module 140 determines a feature impact component value based on a difference of the second output score value and the first output score value, i.e., $f(x_1, x_2, \ldots, \bar{x}_i^{(j)}, \ldots, x_m) - f(x_1, x_2, \ldots, x_i^{(u)}, \ldots x_m)$. The driver impact module 140 determines a feature impact score $Y(x_i^{(u)})$ for the feature as a weighted aggregate of the feature impact component values for the feature Accordingly, the driver impact module 140 approximates the distribution of the values for feature $x_i$ with a histogram of $L_i$ bins. The value $\bar{x}_i^{(j)}$ represents a mean variable value for bin j. The value $w_j$ represents a fractional weight of the number of data points in bin j, such that $\Sigma_j^{Li} w_j = 1$ for all features $x_i$.

For categorical variables, driver impact module 140 uses a bin for each category, thereby having the total number of categories as the number of bins $L_i$. For continuous variables, the driver impact module 140 uses $L_i$ as a hyper parameter based on user input. A user, for example, a system administrator may use the hyper parameter to balance accuracy of the computation with computational complexity. Accordingly, the user may reduce the computational complexity by decreasing the number of bins used. However, decreasing the number of bins used may result in decrease in the accuracy of the computation. Similarly, the user may increase the accuracy by increasing the number of bins at the cost of increased computational complexity.

Figure 5:
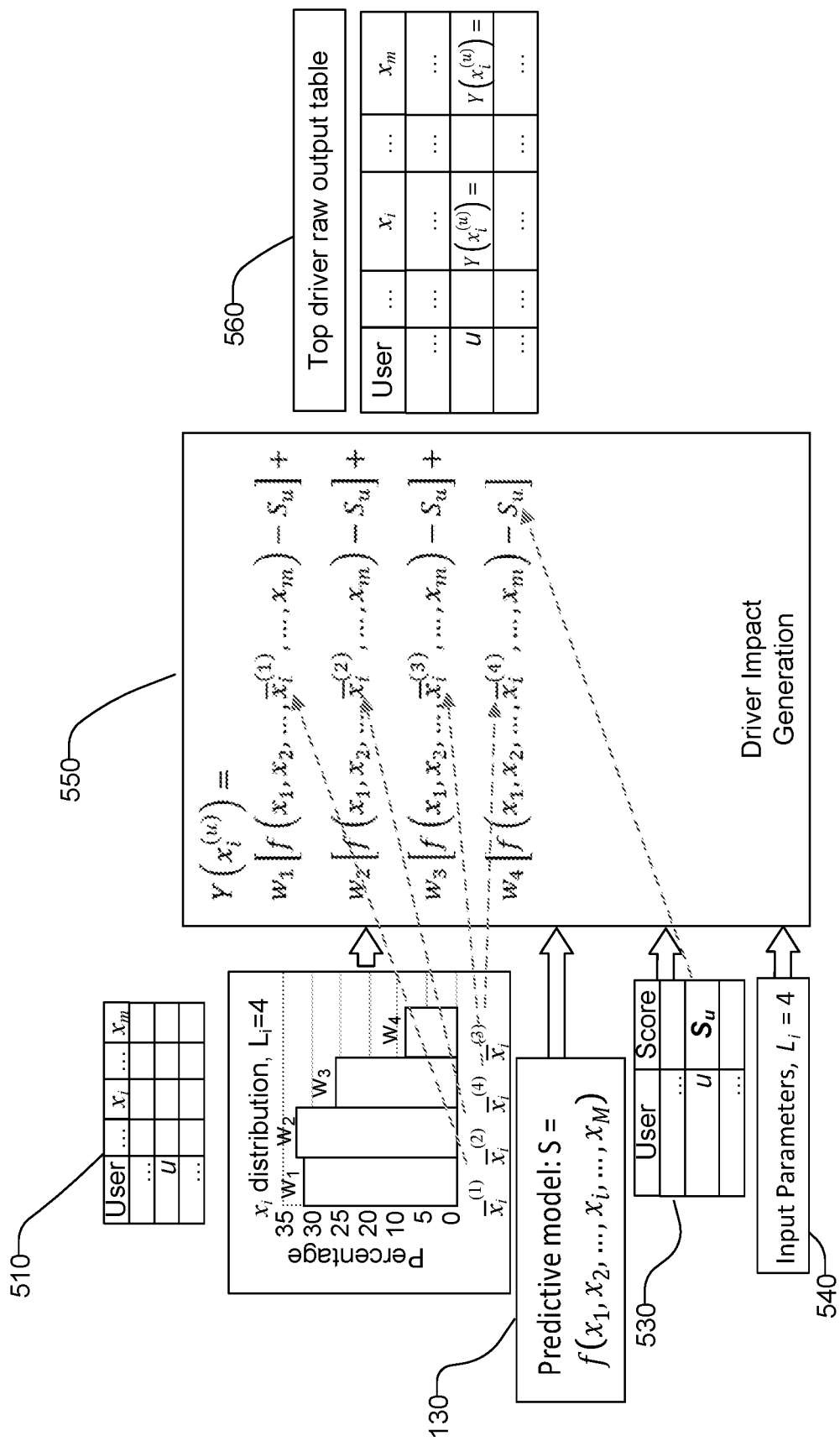
FIG. 5 illustrates the process of determination of top driver features for a user, according to an embodiment.

FIG. 5 illustrates the process of determination of top driver features for a user, according to an embodiment. As shown in FIG. 5, the driver impact module 140 receives various inputs including the feature distribution table 510, the output of the machine learning based model 130, the output 530 of the machine learning based model 130 for the user, the parameters 540 $L_i$ indicating there are four bins in the feature distribution table 510. The driver impact module 140 determines the differences 550 between the model output obtained by replacing a feature value with a mean variable value of a bin and the output 530 of the machine learning based model 130 for the user. The driver impact module 140 aggregates the differences to output the feature impact scores for various features as stored in table 560.

The driver message mapping module 240 generates a message describing the high impact features for a user and provides the message either for display via a user interface or for sending via a message to a user. A feature may also be referred to herein as a variable.

Figure 6:
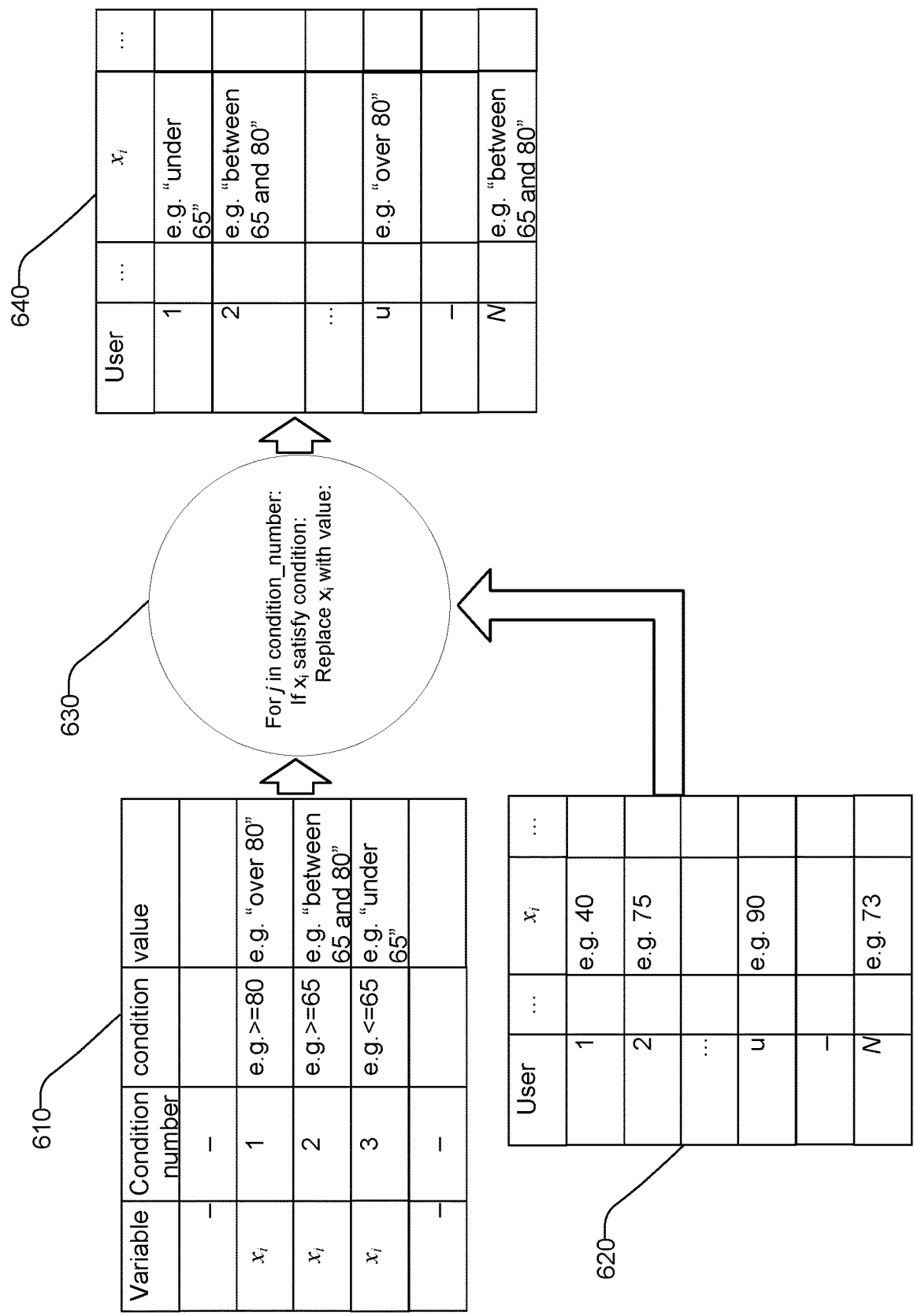
FIG. 6 illustrates the process of determination of a message for display for a top driver feature for a user, according to an embodiment.

FIG. 6 illustrates the process of determination of a message for display for a top driver feature for a user, according to an embodiment. The driver message mapping module 240 maintains a feature bucket mapping table 610 that maps feature values to messages, for example, feature values that are greater than or equal to 80 are mapped to message "over 80", feature values less than 65 are mapped to message "under 65" and so on. The driver impact module 140 determines values 620 of the features for each user. If the feature is identified as a top driver feature for a user, the driver message mapping module 240 determines a condition representing the value of the feature and replaces 630 the feature value with the description corresponding to the condition from table 610 to generate a description for the feature of the user as stored in table 640.

Figure 7:
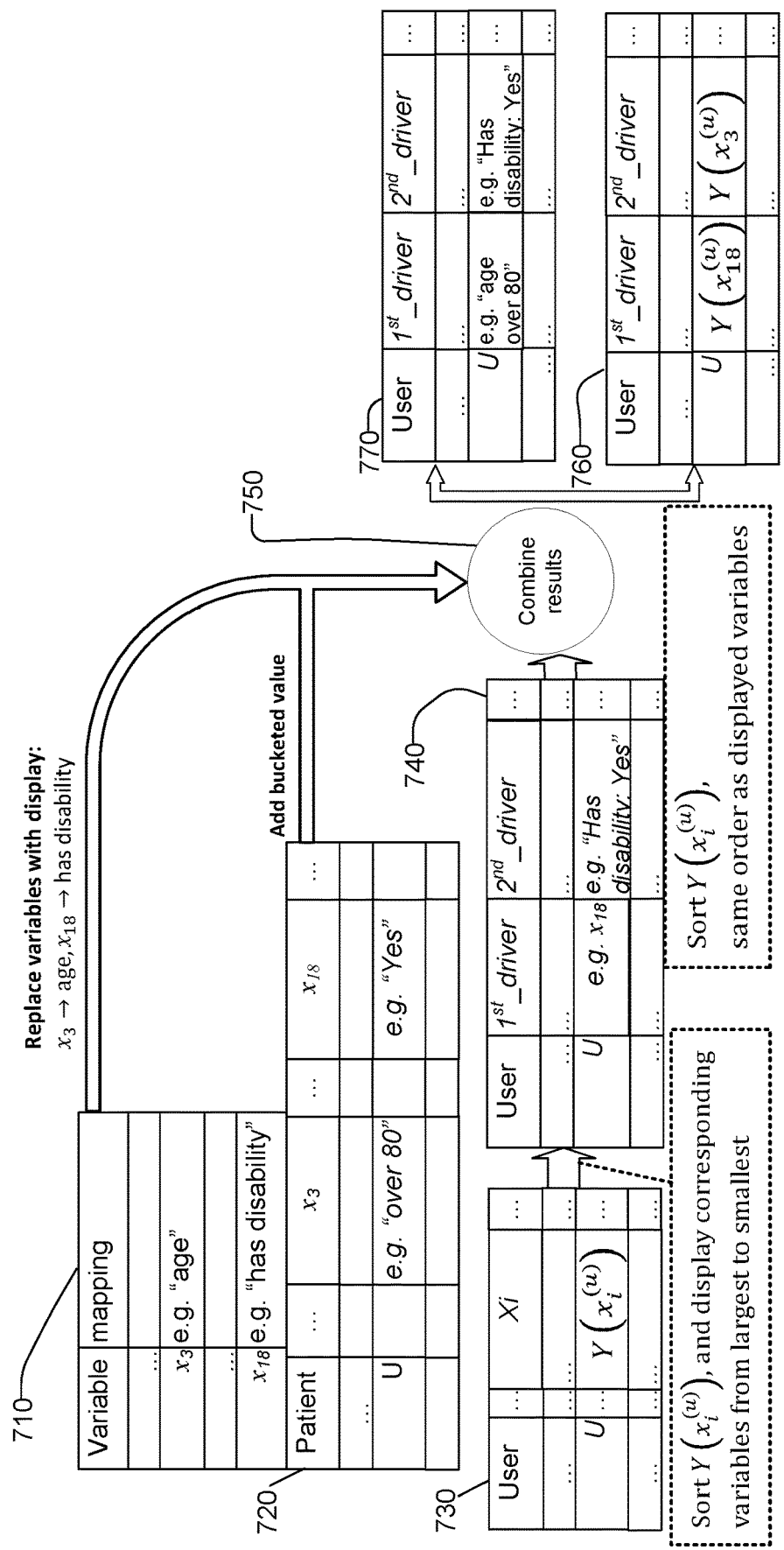
FIG. 7 illustrates the process of displaying top driver features for users, according to an embodiment.

FIG. 7 illustrates the process of displaying top driver features for users, according to an embodiment. The driver message mapping module 240 stores a table 710 mapping features to their display names, for example, feature $x_3$ has a display name "age". The driver message mapping module 240 determines a table 720 that stores the text messages describing the bucketed values of features. Table 720 in FIG. 7 corresponds to table 640 of FIG. 6. The driver impact module 140 determines a table 730 that stores the feature impact scores for various features for each user. The driver impact module 140 ranks features for each user to determine the features representing the top drivers 740. The top driver feature for each user may be different. The driver message mapping module 240 receives requests to display information or specific users and combines the values stored in the tables 740, 710, and 720 to generate table 760 that stores the feature impact scores for the top drivers for the selected user and table 770 that stores the corresponding display text for the features.

Model Validation

In an embodiment, the validation module 220 performs validation of the process of determining feature impacts as follows. The driver impact module 140 determines the feature impact score for features for a plurality of users. For each feature, the validation module 220 aggregates the feature impact score for that feature over the plurality of users. The vector $\bar{Y}$ represents feature impact of all features averaged over a population as follows. Each term of the vector represents an average of the term $Y(x_1^{(u)})$ over all users u.

$$\bar{Y} = \left[ \frac{1}{N} \Sigma_u^N Y(x_1^{(u)}), \frac{1}{N} \Sigma_u^N Y(x_2^{(u)}), \ldots, \frac{1}{N} \Sigma_u^N Y(x_M^{(u)}) \right] \quad (4)$$

The validation module 220 determines a measure of global feature importance from the predictive model training process $Yg = [Y_{g,1}, Y_{g,2}, \ldots, Y_{g,m}]$ as the ground truth and tests $\bar{Y}$ representing the feature impact score averaged over a population of users. $Y_g$ is a vector with its element as numerical values, reflecting the feature importance measure from training process of the machine learning based model, on the population. In an embodiment, the ground truth vector represents the weights of the corresponding features in a machine learning based model. For example, for a logistic regression model where features are continuous variables, $Y_g$ is the parameter vector of the corresponding normalized variables. The validation module 220 determines a correlation value between the two vectors $Y_g$ and $\bar{Y}$, for example, a Spearman correlation $P\bar{Y},Y_g$ as the performance measure. Other embodiments may use other metrics to validate the process, for example, mean reciprocal rank and normalized discounted cumulative gain as validation metrics. The degree of correlation indicates, a quality of the feature impact determination process. For example, if the feature impact score is determined using any other technique, the validation module can validate the process.

Figure 8:
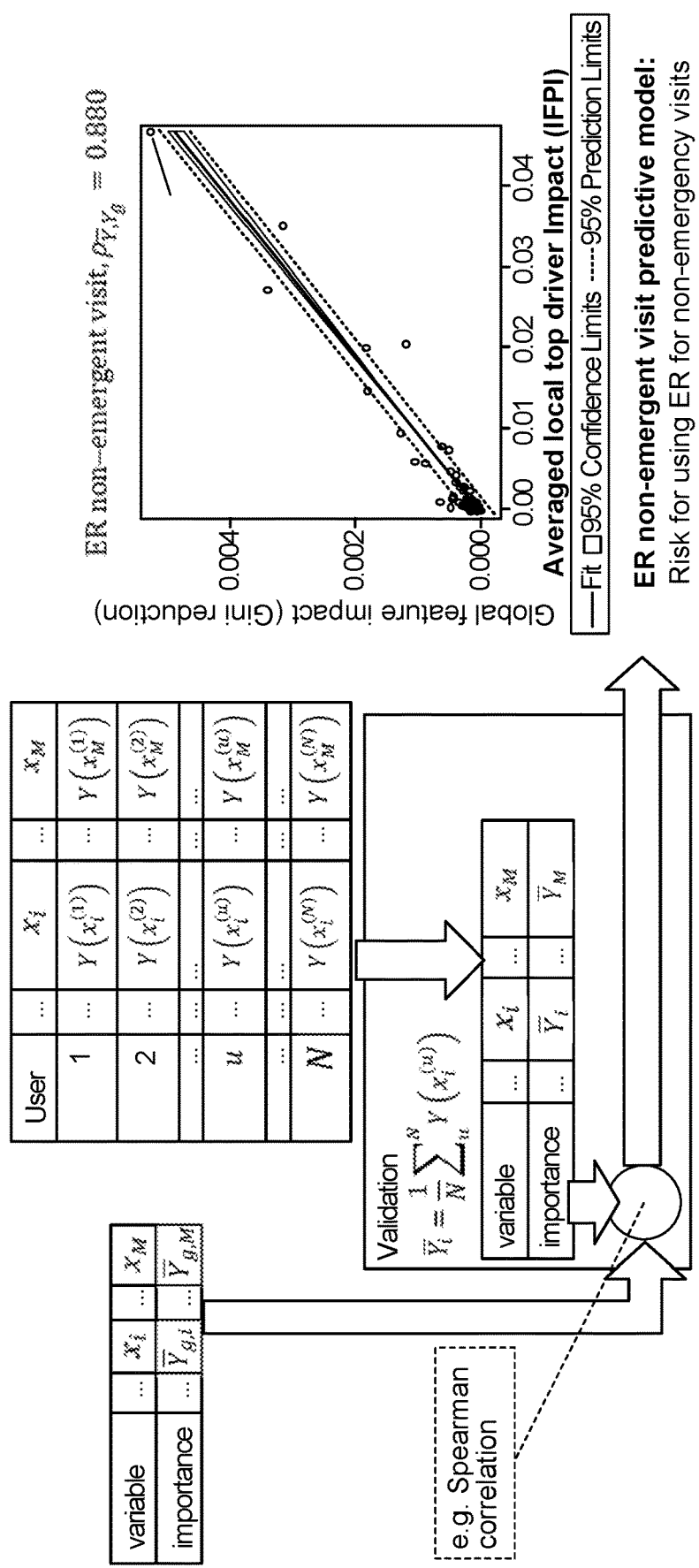
FIG. 8 illustrates the process of validation of the driver impact determination process, according to an embodiment.

FIG. 8 illustrates the process of validation of the driver impact determination process, according to an embodiment. As an example, the processes disclosed herein were used to generate top drivers for emergency room (ER) non-emergency visit use cases. The machine learning based model 130 was trained to predict a likelihood of a user using the ER for non-emergency visit in the next 12 months. The processes disclosed herein were used to determine top driver features for different users. The machine learning based model 130 was based on random forest algorithm. Approximately 300 features were used for each user. Historical data of 3 million users over a period of 12 months was used for training the machine learning based model 130. Spearman correlation of 0.88 was obtained based on the average driver impact and model global feature importance metrics.

Additional Considerations Embodiments

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for determining impact of features on result of a machine learning based model, comprising:
    accessing a machine learning based model configured to receive as input, a plurality of features and to predict an output score;
    identifying a user associated with a feature vector, the feature vector comprising values of the plurality of features;
    for each of the plurality of features:
        identifying a set of feature values of the feature based on training dataset used for training the machine learning based model;
        for each feature value selected from the set of feature values:
            providing the feature vector as input to the machine learning based model to obtain a first output score value,
            determining a modified feature vector by replacing the value of feature in the feature vector with the selected feature value,
            providing the modified feature vector as input to the machine learning based model to obtain a second output score value, and
            determining a feature impact component value based on a difference of the second output score value and the first output score value; and
        determining a feature impact score for the feature based on an aggregate of the feature impact component values for the feature;
    selecting one or more top driver features from the plurality of features based on the feature impact scores for each of the plurality of features;
    generating a description of each of the top driver features; and
    sending the generated description for display.

2. The computer-implemented method of claim 1, wherein the set of feature values comprises features values of each of a plurality of users used for training the machine learning based model.

3. The computer-implemented method of claim 2, wherein the feature impact score for the feature is determined as an average of the feature impact component values for the feature over the plurality of users.

4. The computer-implemented method of claim 1, wherein the set of feature values comprises features values corresponding to each of a plurality of bins, each bin representing one or more feature values for the feature.

5. The computer-implemented method of claim 4, wherein the feature is a categorical feature and the set of feature values comprises a features value corresponding to each category.

6. The computer-implemented method of claim 4, wherein the feature impact score for the feature is determined as a weighted aggregate of the feature impact component values for the feature, wherein the weight for each bin is based on a number of users having feature values of that bin.

7. The computer-implemented method of claim 1, wherein the description of each of the top driver features comprises a name of the feature and a description of a bin corresponding to the feature value.

8. The computer-implemented method of claim 1, further comprising, for a population of users:
for each feature:
determining a population level feature importance score for each feature, and
determining an aggregate feature impact score over all users of the population; and
determining a correlation between the population level feature importance scores and the aggregate feature impact score values.

9. A non-transitory computer readable storage medium storing instructions that when executed by a processor, cause the processor to perform steps comprising:
accessing a machine learning based model configured to receive as input, a plurality of features and to predict an output score;
identifying a user associated with a feature vector, the feature vector comprising values of the plurality of features;
for each of the plurality of features:
identifying a set of feature values of the feature based on training dataset used for training the machine learning based model;
for each feature value selected from the set of feature values:
providing the feature vector as input to the machine learning based model to obtain a first output score value,
determining a modified feature vector by replacing the value of feature in the feature vector with the selected feature value,
providing the modified feature vector as input to the machine learning based model to obtain a second output score value, and
determining a feature impact component value based on a difference of the second output score value and the first output score value; and
determining a feature impact score for the feature based on an aggregate of the feature impact component values for the feature;
selecting one or more top driver features from the plurality of features based on the feature impact scores for each of the plurality of features;
generating a description of each of the top driver features; and
sending the generated description for display.

10. The non-transitory computer readable storage medium of claim 9, wherein the set of feature values comprises features values of each of a plurality of users used for training the machine learning based model.

11. The non-transitory computer readable storage medium of claim 10, wherein the feature impact score for the feature is determined as an average of the feature impact component values for the feature over the plurality of users.

12. The non-transitory computer readable storage medium of claim 9, wherein the set of feature values comprises features values corresponding to each of a plurality of bins, each bin representing one or more feature values for the feature.

13. The non-transitory computer readable storage medium of claim 12, wherein the feature is a categorical feature and the set of feature values comprises a features value corresponding to each category.

14. The non-transitory computer readable storage medium of claim 12, wherein the feature impact score for the feature is determined as a weighted aggregate of the feature impact component values for the feature, wherein the weight for each bin is based on a number of users having feature values of that bin.

15. The non-transitory computer readable storage medium of claim 9, wherein the description of each of the top driver features comprises a name of the feature and a description of a bin corresponding to the feature value.

16. The non-transitory computer readable storage medium of claim 9, wherein the stored instructions when executed by the processor, further cause the processor to perform steps comprising, for a population of users:
for each feature:
determining a population level feature importance score for each feature, and
determining an aggregate feature impact score over all users of the population; and
determining a correlation between the population level feature importance scores and the aggregate feature impact score values.

17. A computer system comprising:
one or more computer processors; and
a non-transitory computer readable storage medium storing instructions that when executed by a processor, cause the processor to perform steps comprising:
accessing a machine learning based model configured to receive as input, a plurality of features and to predict an output score;
identifying a user associated with a feature vector, the feature vector comprising values of the plurality of features;
for each of the plurality of features
identifying a set of feature values of the feature based on training dataset used for training the machine learning based model;
for each feature value selected from the set of feature values:
providing the feature vector as input to the machine learning based model to obtain a first output score value,
determining a modified feature vector by replacing the value of feature in the feature vector with the selected feature value,
providing the modified feature vector as input to the machine learning based model to obtain a second output score value, and
determining a feature impact component value based on a difference of the second output score value and the first output score value; and
determining a feature impact score for the feature based on an aggregate of the feature impact component values for the feature;

selecting one or more top driver features from the plurality of features based on the feature impact scores for each of the plurality of features;

generating a description of each of the top driver features; and sending the generated description for display.

18. The computer system of claim 17, wherein the set of feature values comprises features values of each of a plurality of users used for training the machine learning based model and wherein the feature impact score for the feature is determined as an average of the feature impact component values for the feature over the plurality of users.

19. The computer system of claim 17, wherein the set of feature values comprises features values corresponding to each of a plurality of bins, each bin representing one or more feature values for the feature and wherein the feature impact score for the feature is determined as a weighted aggregate of the feature impact component values for the feature, wherein the weight for each bin is based on a number of users having feature values of that bin.

20. The computer system of claim 17, wherein the description of each of the top driver features comprises a name of the feature and a description of a bin corresponding to the feature value.

* * * * *